United States Patent [19]
Fronek et al.

[11] Patent Number: 5,848,769
[45] Date of Patent: Dec. 15, 1998

[54] DRAG REDUCTION ARTICLE

[75] Inventors: Daniel R. Fronek, Woodbury, Minn.;
Timothy J. Kryzer, Tervuren/Vossem, Belgium

[73] Assignee: Minnesota Mining & Manufacturing Company, St. Paul, Minn.

[21] Appl. No.: 703,325

[22] Filed: Aug. 26, 1996

[51] Int. Cl.⁶ .................................................. B64C 21/10
[52] U.S. Cl. .......................................... 244/200; 244/130
[58] Field of Search ................................... 244/198, 199, 244/200, 130

[56] References Cited

U.S. PATENT DOCUMENTS

| | | |
|---|---|---|
| Re. 24,906 | 12/1960 | Ulrich . |
| 3,334,958 | 8/1967 | Appeldorn . |
| 3,397,428 | 8/1968 | Donald . |
| 3,476,627 | 11/1969 | Squires . |
| 3,684,348 | 8/1972 | Rowland . |
| 3,689,346 | 9/1972 | Rowland . |
| 3,968,196 | 7/1976 | Wiley . |
| 4,181,752 | 1/1980 | Martens . |
| 4,221,757 | 9/1980 | Struassel . |
| 4,444,826 | 4/1984 | Sasaki et al. ............................ 428/216 |
| 4,576,850 | 3/1986 | Martens . |
| 4,585,701 | 4/1986 | Bartoszek et al. ....................... 428/421 |
| 4,599,265 | 7/1986 | Esmay . |
| 4,629,663 | 12/1986 | Brown et al. . |
| 4,668,558 | 5/1987 | Barber . |
| 4,986,496 | 1/1991 | Marentic et al. . |
| 5,069,403 | 12/1991 | Marentic et al. . |
| 5,133,516 | 7/1992 | Marentic et al. . |
| 5,164,245 | 11/1992 | Suzuki . |
| 5,180,634 | 1/1993 | Sempio et al. . |
| 5,183,597 | 2/1993 | Lu . |
| 5,234,740 | 8/1993 | Reeves et al. . |
| 5,242,976 | 9/1993 | Strassel et al. ............................ 525/72 |
| 5,468,540 | 11/1995 | Lu . |

FOREIGN PATENT DOCUMENTS

| | | |
|---|---|---|
| 0 354 022 A1 | 2/1990 | European Pat. Off. ........ B64C 21/10 |
| 0 543 266 A1 | 5/1993 | European Pat. Off. . |
| 0 601 815 A1 | 6/1994 | European Pat. Off. .......... B29D 9/00 |
| 02028239 | 1/1990 | Japan .............................. C08L 27/16 |
| 2151437 | 6/1990 | Japan .............................. B32B 27/08 |
| WO 94/03337 | 2/1994 | WIPO . |

OTHER PUBLICATIONS

ASTM G 53–95 Standard Practice for Operating Light–and Water–Exposure Apparatus (Fluorescent UV Condensation Type) for Exposure of Non–Metallic Materials.

AIAA–88–0138, "Drag Reduction for External Boundary Layers Using Riblets and Polymers," L.W. Reidy and G.W. Anderson, presented at the AIAA 26th Aerospace Sciences Meeting, Jan. 11–14, 1988 at Reno, Nevada.

*Primary Examiner*—Galen L. Barefoot
*Attorney, Agent, or Firm*—Steven E. Skolnick

[57] ABSTRACT

An article for reducing the drag caused by a fluid flowing over a surface comprises an outer layer having an exposed patterned surface that reduces drag, an inner reinforcing layer, and an intermediate layer for bonding the outer layer to the reinforcing layer.

25 Claims, 2 Drawing Sheets

DRAG REDUCTION ARTICLE

BACKGROUND OF THE INVENTION

1. Field of the Invention

This invention relates to articles that can be applied to surfaces to reduce the drag caused by fluids (e.g., air, gas, water, etc.) flowing across such surfaces.

2. Description of the Related Art

It is desirable to reduce the drag caused by bodies passing through fluid media such as an airplane moving through air, a boat moving through water, or a motor vehicle moving through air. Relatively small reductions in drag can significantly reduce the fuel needed to propel the body. Improved fuel economy can result.

To enhance their utility, drag reduction articles should possess certain properties. For example, they should be weatherable. That is, the drag reduction articles should not deteriorate or lose performance as a result of exposure to ultraviolet radiation, wind, sand, rain, snow, ice, repeated and substantial changes in temperature, etc. In addition, routine maintenance may require that the drag reduction article be removed or replaced. Ideally, this should not be cumbersome. The drag reduction article should remove cleanly and easily from a surface to which it has been applied.

Various drag reduction articles are known and comprise a thermoplastic or thermoset polymeric film having a patterned surface that reduces drag. Examples of these articles can be found in U.S. Pat. Nos. 4,986,496, 5,069,403, and 5,133,516, each to Marentic et al. The articles disclosed in these patents usefully reduce drag. However, they would be even more useful if they were easier to remove once they had been applied to a surface. In addition, these drag reduction articles may turn yellow with time, which can be unsightly, or suffer other degradation from weather exposure.

SUMMARY OF THE INVENTION

In general, this invention relates to articles that can be applied to surfaces to reduce the drag caused by fluids (e.g., air, gas, water, etc.) flowing across such surfaces. More specifically, and in one embodiment, this invention pertains to a multilayer drag reduction article that comprises an outer layer having an exposed, patterned surface that reduces the drag caused by a fluid flowing over the surface; an inner, reinforcing layer, and an intermediate bonding layer for bonding the outer layer to the reinforcing layer.

Preferably, the outer layer comprises a blend of at least one polymer having good bonding properties to the intermediate bonding layer, and at least one polymer having good chemical and weather resistance properties so as to render the drag reduction article suitable for use in aerospace applications. The polymer having good bonding properties to the intermediate bonding layer is typically an acrylic polymer, and especially preferably comprises the polymerization product of at least one monomer selected from the group consisting of methyl methacrylate, ethyl methacrylate, butyl methacrylate, and blends thereof Poly (methyl methacrylate) is most preferred. The polymer having good chemical and weather resistance properties is typically a fluoropolymer, especially one that includes polymerized units of vinylidene fluoride, such as poly(vinylidene fluoride), tetrafluoroethylenehexafluoropropylene-vinylidene fluoride terpolymer, and blends thereof The intermediate bonding layer also preferably comprises a blend of a fluoropolymer and an acrylic polymer, and those which are useful may be selected from among those used to provide the outer, patterned layer. Typically, the intermediate bonding layer employs a higher weight percentage of the acrylic polymer so as to promote good adhesion between the reinforcing layer and the outer, patterned layer. Thus, in one preferred embodiment, the outer layer includes a blend of at least 70% by weight fluoropolymer (more preferably, at least 70–90% by weight, and most preferably about 90% by weight), and at most 30% by weight acrylic polymer (more preferably, at most 10–30% by weight, and most preferably about 10% by weight), while the intermediate bonding layer is based on a blend of at most 30% by weight fluoropolymer (more preferably, at most 10–30% by weight, and most preferably about 10% by weight), and at least 70% by weight acrylic polymer (more preferably, at least 70–90% by weight, and most preferably about 90% by weight).

The inner reinforcing layer may be provided by a thermoplastic polyurethane or poly(vinyl chloride), although the former is preferred.

In addition, the drag reduction article may optionally, though quite desirably, include a layer of adhesive (e.g., a pressure sensitive adhesive) on the inner reinforcing layer for bonding the drag reduction article to a surface or a substrate.

The exposed, patterned surface in the outer layer generally comprises a series of essentially parallel peaks separated by a series of essentially parallel valleys, although a variety of wave forms within this description are possible so long as they reduce the drag caused by a fluid flowing over the surface to which the drag reduction article has been attached. Such surfaces include the surface of an airplane, the hull of a boat or other watercraft, the surface of a motor vehicle, or the interior surface of a fluid-conveying conduit.

In another embodiment, the invention relates to a method of reducing the drag caused by a fluid flowing over a surface. The method comprises the steps of:

(a) providing a surface over which a fluid may flow;

(b) providing an article capable of reducing the drag created by the fluid flowing over the surface provided in step (a); and (c) attaching the article from step (b) to the surface provided in step (a) so as to reduce the drag created by the fluid flowing over that surface.

Any of the previously described drag reduction articles may be used in step (b).

BRIEF DESCRIPTION OF THE DRAWINGS

The invention will be more fully appreciated by referring to the following drawings in which similar reference numerals designate like or analogous components and in which.

DETAILED DESCRIPTION OF THE PREFERRED EMBODIMENTS

Figure 1:
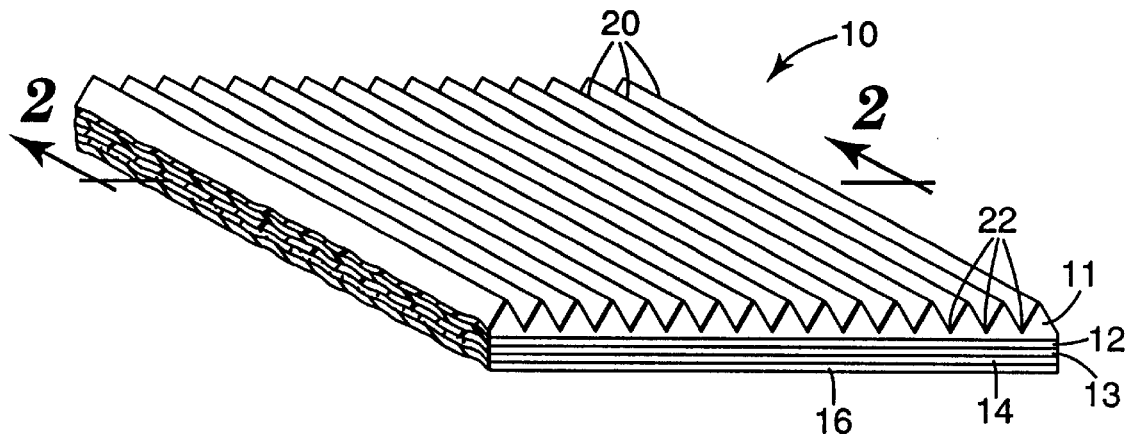
FIG. 1 is a fragmentary perspective view of one embodiment of a drag reduction article according to the invention.
Figure 2:
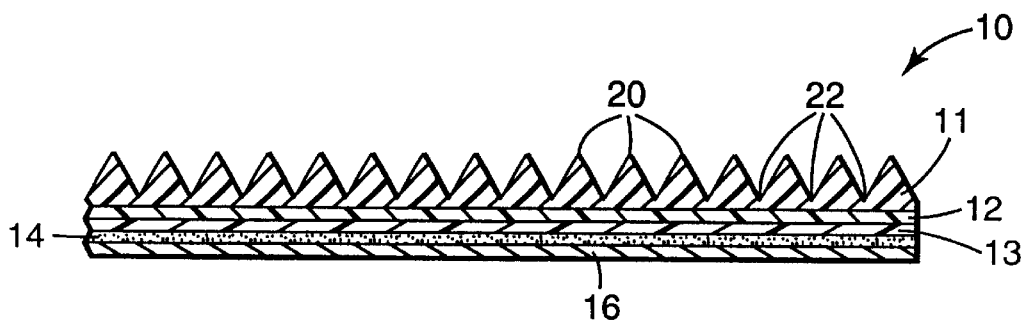
FIG. 2 is a sectional view taken along lines 2—2 in FIG. 1.

Turning now to the drawings, FIGS. 1 and 2 illustrate a drag reduction article 10 according to the invention and which may be opaque, translucent or transparent. Drag reduction article 10 comprises an outer patterned layer 11, an intermediate bonding layer 12, an inner, reinforcing layer 13, an optional substrate bonding layer 14, and an optional temporary, removable, protective liner 16. The drag reduction article (exclusive of bonding layer 14) typically and advantageously comprises thermoplastic materials so as to facilitate manufacturing the drag reduction article. Thermoplastic materials can be repeatedly reheated and reformed, which assists in manufacturing the drag reduction article by extrusion processes as described more fully hereinbelow. Preferably, drag reduction article 10 is about 50 to 400 microns thick (about 2 to 16 mils), more preferably about 75 to 150 microns (about 3 to 6 mils) thick.

Outer layer 11 is capable of being formed into a pattern (described more fully hereinbelow) that imparts drag reducing characteristics to article 10. In addition, outer patterned layer 11 is sufficiently resistant to chemical and weather exposure to permit the use of drag reduction article 10 in aerospace applications. Layer 11 can withstand extended exposure to water, oil, fuel, solvents, hydraulic fluids and the like without a noticeable deterioration in its physical properties, performance or appearance. Further, it is not appreciably affected by acid rain, bird dung, and other harsh environmental agents to which the drag reduction article 10 may be exposed during normal use. Typically, drag reduction articles according to the invention show no substantial change in appearance or removability, even when subjected to accelerated weathering (e.g., ultraviolet radiation and moisture) for 500 hours according to the procedure described in ASTM G 53–95 "Standard Practice for Operating Light-and Water-Exposure Apparatus (Fluorescent UV Condensation Type) for Exposure of Non-Metallic Materials."

Intermediate bonding layer 12 imparts good handling characteristics to the drag reduction article and promotes adhesion between outer layer 11 and reinforcing layer 13.

In order to achieve these desirable properties, outer patterned layer 11 and intermediate bonding layer 12 are preferably provided as blends of different polymers, at least one of which has good chemical resistance and weatherability, and at least one of which has good bonding properties. ("Polymer" is used broadly in this context to encompass both homopolymers and copolymers; i.e., polymers derived from more than one monomer.) Fluoropolymers, in particular those that contain polymerized units of vinylidene fluoride, have been found to have good chemical resistance and weatherability. Acrylic polymers, in particular those that contain polymerized units of short chain alkyl methacrylates, have been found to have good bonding properties and handling characteristics.

Preferably outer patterned layer 11 and intermediate bonding layer 12 are formed as different blends of the fluoropolymer and the acrylic polymer, the actual amounts depending upon the desired balance between chemical resistance, ultraviolet (UV) radiation resistance, weather resistance, and stiffness afforded by the fluoropolymer, and adhesion, flexibility and handling ability imparted by the acrylic polymer. Outer patterned layer 11 often employs a higher weight percentage of the fluoropolymer where its UV radiation, weathering and chemical resistance properties are needed, while intermediate bonding layer 12 uses a higher percentage of acrylic polymer where good bonding properties are needed between outer patterned layer 11 and reinforcing layer 13. Outer patterned layer 11 preferably comprises a blend of 70% to 100% by weight fluoropolymer, and 0% to 30% by weight acrylic polymer, more preferably 70% to 90% by weight fluoropolymer and 10% to 30% by weight acrylic polymer, and most preferably about 90% by weight fluoropolymer and 10% by weight acrylic polymer. Preferably intermediate bonding layer 12 comprises a blend of 70% to 100% by weight acrylic polymer and 0% to 30% by weight fluoropolymer, more preferably 70% to 90% by weight acrylic polymer and 10% to 30% by weight fluoropolymer, and most preferably about 90% by weight acrylic polymer and 10% by weight fluoropolymer.

Suitable vinylidene fluoride-containing fluoropolymers include poly(vinylidene fluoride) (PVDF), tetrafluoroethylene-hexafluoropropylenevinylidene fluoride terpolymer (THV), and blends thereof Such materials tend to have a melt flow index (MFI) of about 6–120, when measured according to ASTM D-1238 at 230° C. and 5 kg, and an apparent viscosity of 400–30,000 Pascal.seconds, when measured at 240° C. and 50 sec$^{-1}$ by conventional means using a capillary rheometer. PVDF is preferred because it can be formed into precise patterns to provide layer 11 with a drag reducing shape and provides stiffness. PVDF has the ability to retain a precise drag reducing pattern more easily than the thermoplastic materials previously used for drag reduction articles. Examples of useful THV-containing compositions are described in International Patent Publication No. WO 96/07701 "Melt-Processable Fluoroplastic."

Various acrylic polymers may be used, e.g., medium to low molecular weight acrylic resins having a weight average molecular weight below 750,000, including blends or copolymers comprising at least two materials selected from the group consisting of methyl methacrylate, ethyl methacrylate, butyl methacrylate, and methacrylate copolymers. Poly(methyl methacrylate) (PMMA) is most preferred.

Layers 11 and 12 may also include additives such as UV stabilizers (e.g., the TINUVIN family of stabilizers available from Ciba-Geigy Corp.); antioxidants; fillers such as glass, ceramic or polymeric bubbles; pigments; processing aids such as polyolefin polymers; and fire retardants.

Outer patterned layer 11 may be about 5 to 250 microns (about 0.2 to 10 mils) thick, preferably about 10 to 40 microns (about 0.5 to 1.5 mils) thick. Intermediate bonding layer 12 may be about 2.5 to 75 microns (about 0.1 to 3 mils) thick, preferably about 3 to 12 microns (about 0.1 to 0.5 mils) thick. Overall, the combined thickness of layers 11 and 12 may be about 7.5 to 325 microns (about 0.3 to 13 mils), preferably about 15 to 50 microns (about 0.6 to 2.0 mils). If the combined thickness is greater than about 325 microns (13 mils), the conformability of the drag reduction article may be decreased, and weight and cost are added to the drag reduction article which may be undesirable.

Reinforcing layer 13 reinforces outer patterned layer 11 and intermediate bonding layer 12, providing strength and elongation, which contribute to easy removal of the drag reduction article. It is highly preferred that the material comprising reinforcing layer 13 be more elastic than the materials comprising layers 11 and 12 and have good elongation, e.g. at least about 300%, without breaking. Without being bound by theory, it is believed that greater elasticity and toughness in reinforcing layer 13 contributes to the removability of the drag reduction article. It also serves to reduce stress at the interface between layers 12 and 13 when the article is applied to a substrate.

Suitable materials for reinforcing layer 13 include thermoplastic urethanes, and poly(vinyl chloride). Examples of thermoplastic urethanes include polyester-urethane, polyether-urethane, and polycaprolactone-urethane (e.g., the Morthane™ family of urethanes from Morton Intentional) and blends thereof. The reinforcing layer can include UV stabilizers, antioxidants, fillers, pigments and post-crosslinking additives.

Reinforcing layer 13 is about 35 to 300 microns (about 1.5 to 12 mils) thick, preferably about 50 to 100 microns (about 2 to 4 mils) thick. When the thickness of the reinforcing layer is greater than about 300 microns, this adds weight and cost to the drag reduction article which may be undesirable. If the thickness of reinforcing layer is less than about 35 microns, then the removability of the drag reduction article from a substrate may be adversely compromised.

Figure 3:
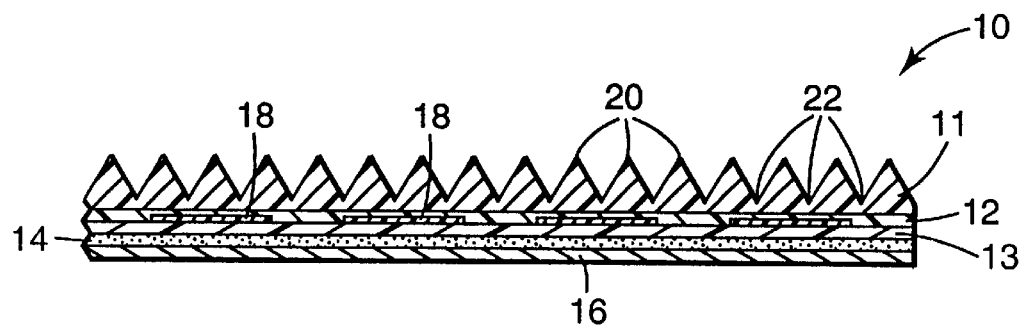
FIG. 3 is sectional view similar to FIG. 2 but showing an alternative embodiment of the invention in which the drag reduction articles bears graphic indicia.

As best shown in FIG. 3, reinforcing layer 13 may carry or bear a continuous or discontinuous graphic layer 18 (although only the latter is illustrated in FIG. 3) such as a graphic design, logo, alpha-numeric characters, etc. that can be aesthetic and/or functional. Graphic layer 18 may be provided as an ink (e.g., a pigment dispersed in a compatible binder) and applied to reinforcing layer 13 using any of the known printing techniques. (Though not specifically shown in the drawings, graphic layer 18 may be applied to outer patterned layer 11, intermediate bonding layer 12, or substrate bonding layer 14.)

Optional bonding layer 14 adheres the drag reduction article to a substrate, e.g., the surface of an airplane, the hull of a boat or other watercraft, the surface of a motor vehicle, or the interior surface of a fluid-conveying conduit. Preferably, the bonding layer is an adhesive (in particular, a pressure sensitive adhesive), although other attachment systems such as mechanical fasteners may be used in appropriate circumstances. Useful pressure sensitive adhesives include polyacrylates, such as those that comprise a polymer of an acrylate ester of acrylic acid with a non-tertiary alcohol. Most preferably, the adhesive comprises the polymerization product of 85 to 98% by weight of one or more (co)polymerizable acrylate ester monomers, and 2 to 15% by weight of a copolymerizable acid or amide. Multifunctional acrylates, copolymerizable photoinitiators, or combinations of the two may also be present in a total amount of up to 0.5% by weight so as to provide some crosslinking, which can contribute to easy removability, better fluids resistance and improved high temperature performance of the drag reduction article. Ultimately, removability is a balance among the peel adhesion, the degree of crosslinking, and the thickness of the bonding layer, and the toughness of the reinforcing layer. Adhesives suitable for the bonding layer and methods for their preparation are disclosed in U.S. Pat. Nos. 4,599,265 (Esmay); 4,629,663 (Brown et al.); RE 24,906 (Ulrich); and 4,181,752 (Martens).

The thickness of the substrate bonding layer 14 is not critical and may be about 10 to 125 microns (about 0.4 to 5 mils), more preferably about 12 to 50 microns (about 0.5 to 2 mils). If the substrate bonding layer thickness is greater than about 125 microns, then it may be more difficult to remove the drag reduction article from a substrate to which it has been applied and the weight of the article may be unnecessarily increased. However, if the bonding layer thickness is less than about 10 microns, it may not provide enough adhesion to hold the drag reduction article in place during use.

Drag reduction article 10 may further and optionally include a temporary liner 16 that protects substrate bonding layer 14 from contamination by dirt and other materials and which is removed shortly before the drag reduction article is applied to a surface. Liner 16 may be provided as, for example, an untreated polyolefin sheet, or a silicone- or fluorosilicone-treated paper or plastic sheet.

Figure 4:
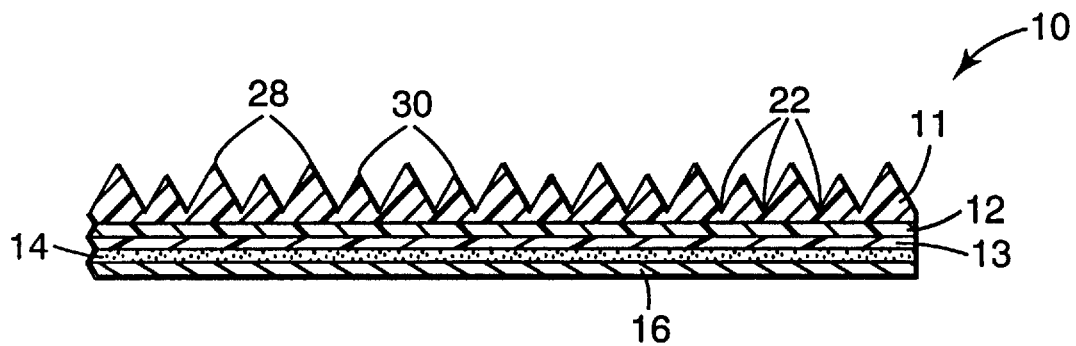
FIG. 4 is a sectional view analogous to FIG. 2 but showing a different patterned surface useful in drag reduction articles according to the invention.
Figure 5:
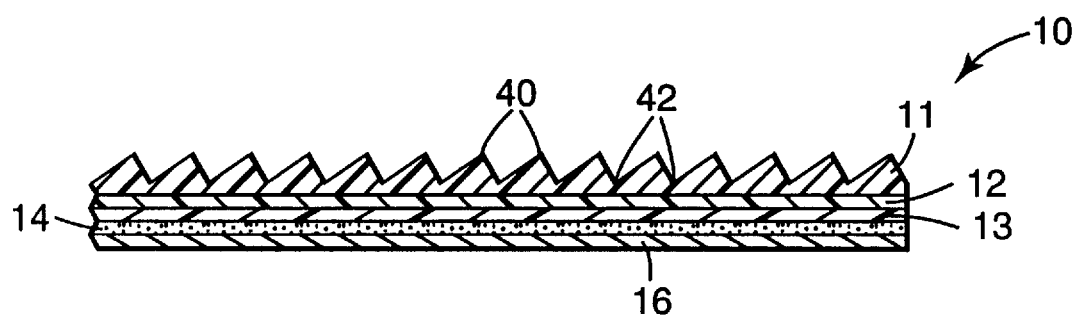
FIG. 5 is a sectional view similar to FIG. 4 and illustrating another patterned surface useful in drag reduction articles according to the invention.

Outer patterned layer 11 includes a patterned outer surface adapted to reduce the resistance (drag) to a fluid (e.g., air, gas, water, etc.) flowing over layer 11. In general, and still referring to FIGS. 1 to 3, the patterned surface comprises a series of essentially parallel peaks 20 separated by a series of essentially parallel valleys 22. In cross-section the patterned surface may assume a variety of wave forms. For example, FIGS. 1 to 3 show a symmetric saw tooth pattern in which each of the peaks are identical as are each of the valleys. FIG. 4 shows a series of parallel peaks 28 and 30 that are of different heights, separated by a series of parallel valleys 22. FIG. 5 shows a saw tooth pattern of alternating, parallel, asymmetric peaks 40 separated by a series of parallel, asymmetric valleys 42.

While only continuous peaks and valleys are shown, a discontinuous pattern of peaks and valleys is also contemplated. Thus, for example, the peaks and valleys may terminate for a portion of the article. The valleys may either narrow or widen as the peak or valley progresses from one end of the article to the other. Still further, the height and/or width of a given peak or valley may change as the peak or valley progresses from one end of the article to the other.

The dimensions of the peaks and valleys are not critical to the invention provided that whatever patterned surface is employed, it provides the desired reduction in drag. The optimum dimensions are somewhat dependent upon the speed at which the substrate to be covered passes through the fluid (or the speed at which the fluid passes over the substrate). For more discussion on this topic, see AIAA-88-0138, "Drag Reduction for External Boundary Layers Using Riblets and Polymers," L. W. Reidy and G. W. Anderson, presented at the AIAA 26th Aerospace Sciences Meeting, Jan. 11–14, 1988 at Reno, Nev. However, it has been found that peaks having a height of about 10 to 250 microns (about 0.4 to 10 mils) are useful. Within this range it is preferred that the peaks be about 20 to 150 microns (about 0.8 to 6 mils) high for high speed uses (e.g., aircraft). The peak-to-peak spacing between adjacent peaks likewise is not critical to the invention. A spacing of about 10 to 250 microns (about 0.4 to 10 mils) is useful, although, for aircraft applications, a spacing of about 20 to 150 microns (about 0.8 to 6 mils) is preferred. The included angle between adjacent peaks can also vary. While flat and round bottom valleys may be useful, it is preferred that the valleys and peaks be generally V-shaped and have an included angle of from 15° to 140°, more preferably from 50° to 60°.

Drag reduction articles according to the invention may be readily manufactured by a variety of techniques. For example, the drag-reducing pattern may be imparted during the manufacture of layers 11 and/or 12, or alternatively, a pre-formed web comprising one or more of layers 11, 12, 13, 14 and 16 may be provided and a drag-reducing pattern formed in layer 11. Once manufactured, the drag reduction article can be wound about a core into roll form for easy storage, shipping and use.

In one approach, the polymers for outer patterned layer 11 and intermediate bonding layer 12 are coextruded (i.e., extruded together at the same time). In a second approach, intermediate bonding layer 12 and reinforcing layer 13 may be coextruded and then joined to outer patterned layer 11. Alternatively, each of the layers could be extruded separately and thereafter joined together, for example, by lamination or adhesive bonding. Almost any combination of layers may be coextruded then joined to the remaining layers. The different layers may also be assembled by various sequential or tandem coating methods. Combinations of coating and extrusion are also contemplated. The patterned surface may be formed by embossing techniques utilizing heat and/or pressure. Of course, other techniques are also possible and will be readily thought of by those skilled in the art.

Reinforcing layer 13 may be joined to intermediate bonding layer 12 by coextruding layers 11, 12 and 13. Alternatively, reinforcing layer 13 may be extruded, coated, or laminated onto a previously formed sheet comprising layers 11 and 12. It is highly preferable that the materials in adjacent, contacting layers be compatible and either adhere together by themselves or be capable of being adhered together so as to provide sufficient interlayer adhesion that the drag reduction article does not delaminate during normal use. A large proportion of acrylic polymer in intermediate bonding layer 12 promotes good adhesion between outer patterned layer 11 and reinforcing layer 13.

Substrate bonding layer 14 is applied to the surface of reinforcing layer 13 that is opposite the surface that contacts intermediate bonding layer 12. For example, bonding layer 14 can be coated onto a web comprising layers 11, 12 and 13 that have been previously joined together. Alternatively, bonding layer 14 can be coated onto a release liner and transfer laminated to a pre-formed web comprising layers 11, 12 and 13 by passing the pre-formed web and the bonding layer-coated release liner between rubber rolls, which may be heated if needed.

Temporary, removable, protective liner 16 may then be laminated to substrate bonding layer 14 or previously applied to a bonding layer that is subsequently transfer laminated to reinforcing layer 13.

Another useful technique comprises applying a radiation curable composition to a flexible carrier, contacting the radiation curable composition with a master bearing the positive structure of the desired pattern, and radiation curing the composition. The resulting tooling sheet may be removed from the master and subsequently used to impart a pattern to outer layer 11 by coating, extruding or coextruding the materials for layers 11, 12 and/or 13 onto the tooling sheet. Additional information about such manufacturing techniques can be found in U.S. Pat. No. 4,576,850 (Martens), U.S. Pat. No. 5,183,597 (Lu), and U.S. Pat. No. 5,468,540 (Lu).

Still another approach involves taking a web comprised of layers 11, 12 and 13 and laminating a tooling sheet to layer 11 using heat and/or pressure in order to impart the pattern of the tooling sheet to the surface of layer 11.

The use of a tooling sheet can be advantageous in that it also acts as a carrier web to protect layer 11 through any additional processing operations such as corona treating, substrate bonding layer attaching, slitting, or perforating. It is removed prior to using the drag reduction article or it can be removed at any time during the manufacture of the drag reduction article.

The drag reduction articles of the invention may be readily applied to a variety of substrates to reduce the drag experienced when that substrate moves through a fluid medium or when a fluid moves past the substrate. Preferably the article is positioned on the substrate such that the patterned surface will provide maximum drag reduction. When the patterned surface comprises parallel peaks and valleys, maximum drag reduction is achieved when the peaks and valleys are generally parallel to the fluid flow. The article may be stretched, if desired, to conform to the substrate surface and to remove unwanted wrinkles and air bubbles. Providing perforations or other discontinuities (e.g., slits) in the drag reduction article can facilitate applying the drag reduction article to a substrate and accommodates the passage of moisture and vapors through the article.

The invention will be more fully appreciated with reference to the following non-limiting examples. Various abbreviations and tradenames employed in the examples are defined according to the table below.

Abbreviations and Tradenames

| Abbreviation | Description | Source |
|---|---|---|
| I-Outer Patterned Layer and Intermediate Bonding Layer | | |
| PVDF-1 | Polyvinylidene fluoride, nominal MFI = 120 g/10 minutes* | Solef ™ Grade 1006 from Solvay Plastics, Houston, TX |
| PVDF-2 | Polyvinylidene fluoride, nominal MFI = 24g/10 minutes* | Solef ™ Grade 1008 from Solvay Plastics |
| PVDF-3 | Polyvinylidene fluoride, nominal MFI = 6 g/10 minutes* | Solef ™ Grade 1010 from Solvay Plastics |
| PMMA-1 | Poly(methylmethacrylate), melt index 27 | CP-41 from ICI Acrylics Inc., St. Louis, MO |
| II - Reinforcing Layer | | |
| PU-1 | Polycaprolactone-based thermoplastic polyurethane | Morthane ™ PN03-215 from Morton International, Seabrook, NH |
| III - Substrate Bonding Layer | | |
| IOA | Isooctyl acrylate | — |
| AA | Acrylic acid | — |
| HDDA | 1,6-hexanediol diacrylate | SR-238 from Sartomer Co., West Chester, PA |
| KB-1 | 2,2-dimethyl-2-phenyl-1-phenylethanone | Esacure ™ KB-1 from Sartomer Co., West Chester, PA |

*All melt flow indices (MFI) are measured at 230° C. and 5 kg, according to ASTM D-1238.

EXAMPLES

Preparation of a Carrier Web/Tooling Sheet

A patterned tooling sheet was prepared from the following materials:

A 125 micron (5 mils) thick polyester film was coated with a UV curable acrylic prepolymer solution of the following ingredients to provide a coating weight of approximately 34 g/m$^2$ (3.2 gm/ft.$^2$):

a. 59.5% by weight bisphenol-A epoxy diacrylate (Photomer™ 3016 from Henkel Corp., Ambler, Pa.);

b. 39.5% by weight phenoxyethyl acrylate (Photomer™ 4035 from Henkel Corp., Ambler, Pa.); and C. 1.0% by weight 2-hydroxy-2-methyl-1-phenylpropan-1-one (Darocur™ 1173 from Ciba-Geigy, Hawthorne, N.Y.) and was passed through a squeeze roll nip with the solution contacting a cylinder engraved with a grooved pattern. While in contact with the engraved cylinder, the solution was exposed to a UV light source (medium pressure mercury lamp, 400 watts, from Actek International, Plainsville, Ill.) for approximately 0.1–1.0 second to cure the solution. The cured material was stripped from the cylinder and used as a carrier web/tooling sheet to impart the grooved pattern to the drag reduction article surface.

The pattern on the cured material surface had a cross-section similar to that of FIG. 2 with a 62.5 microns (2.5 mils) peak height, a 62.5 microns (2.5 mils) peak to peak spacing, and an included angle between adjacent peaks of 53°.

General Preparation of Drag Reduction Article

A drag reduction article in which the reinforcing layer, the intermediate bonding layer, and the outer patterned layer were coextruded was prepared as follows.

Each layer was independently fed by a single screw extruder having a length:diameter ratio of 24:1 to a three-layer coextrusion die having a 635 mm×0.51 mm (25×0.02 inches) opening. Each extruder had multiple heating zones with the last zone set between 204.5°–215.5° C. (400–420° F.). The coextrusion die temperature was set at 215.5° C. (420° F.).

The extruders were charged as follows:

Extruder A: Layer A=Outer patterned layer 11;

Extruder B: Layer B=Intermediate bonding layer 12; and

Extruder C: Layer C=Reinforcing layer 13.

The extruders were plumbed to the die such that Layer A exited the die and was placed directly in contact with the carrier web/tooling sheet described above. Layer B exited as the middle layer, and Layer C exited as the layer on the side of Layer B opposite from the carrier web/tooling sheet.

The carrier web was fed through a nip consisting of a polished chrome roll and a matte-finished ground silicone rubber roll. The temperature of both nip rolls was maintained at 88° C. (190° F.).

The hot multilayer extrudate was cast onto the carrier web/tooling sheet and immediately nipped between nip rolls at a roll pressure of 21 kg/cm (118 lbs per lineal inch). Surface speed of the rolls was 8.5 m (28 ft.)/inin. Layer A of the resulting film exactly replicated the pattern of the carrier web/tooling sheet.

The film was then coated, on Layer C which had been corona treated, with a pressure sensitive adhesive (prepared from a prepolymer mixture consisting of 94 parts by weight IOA, 6 parts by weight AA, 0.14 parts by weight photoinitiator (KB-1), and 0.2 parts by weight HDDA per 100 parts by weight of monomers). The adhesive coating thickness was approximately 37 microns (1.5 mils). The adhesive layer was irradiated in an inert atmosphere with a constant total UV energy of 450–500 mjoules/cm$^2$) and then covered with a 75 microns (3 mil) thick clear silicone-treated polyethylene film removable protective liner. The construction was then perforated with a carbon dioxide laser to give a 12.5 mm×6.35 mm (0.5 inch×0.25 inch) pattern of 0.20 mm (0.008 inch) diameter through holes. The carrier web/tooling sheet and the protective liner were removed prior to the application of the drag reduction article to a substrate.

EXAMPLES 1–7

In these examples, films consisting of a reinforcing layer, an intermediate bonding layer, and an outer patterned layer were prepared with varying amounts of PVDF and PMMA in the latter two layers.

The films were prepared according to the General Preparation described above with the exception that no adhesive was coated onto the film and the film was not perforated. The reinforcing layer (i.e., Layer C) was 69 microns (2.75 mils) thick PU-1. The ingredients and the amounts used for Layers A (i.e., the outer patterned layer) and B (i.e., the intermediate bonding layer) are given in Table 1.

TABLE 1

| Example No. | Layer A - Wt. % PVDF-1 | Layer A - Wt. % PMMA-1 | Layer B - Wt. % PVDF-1 | Layer B - Wt. % PMMA-1 |
|---|---|---|---|---|
| 1 | 100 | 0 | 0 | 100 |
| 2 | 100 | 0 | 10 | 90 |
| 3 | 100 | 0 | 50 | 50 |
| 4 | 70 | 10 | 10 | 90 |
| 5 | 70 | 30 | 0 | 100 |
| 6 | 70 | 30 | 10 | 90 |
| 7 | 70 | 30 | 30 | 70 |

The samples were then examined under a 100 power microscope. Each profile was characterized by sharp peaks and valleys. The examples demonstrate the ability to provide an outer patterned layer (Layer A) having sharp peaks and valleys useful for reducing drag caused by a fluid flowing over the layer.

EXAMPLES 8–9

Films were prepared with varying grades of PVDF in the outer patterned layer (i.e., Layer A). Films were prepared according to Examples 1–7 described above. Example 2 is repeated here for completeness. The ingredients and the amounts used are given in Table 2.

TABLE 2

| Example No. | Layer A - Wt. % PVDF | Layer A - Wt. % PMMA-1 | Layer B - Wt. % PVDF-1 | Layer B - Wt. % PMMA-1 |
|---|---|---|---|---|
| 2 | 100 PVDF-1 | 0 | 0 | 90 |
| 8 | 100 PVDF-2 | 0 | 10 | 90 |
| 9 | 100 PVDF-3 | 0 | 10 | 90 |

The samples were then examined under a 100 power microscope to determine the sharpness of the profile produced using the various layer compositions. Each example had sharp peaks and valleys. These data show that the melt flow index of the fluoropolymer can be varied while still obtaining sharp peaks and valleys useful for reducing drag in the outer patterned layer.

EXAMPLE 10

A drag reduction article was prepared according to the General Preparation described above with the following construction:

Layer A/Outer patterned layer: 19 microns (0.75 mil) thick 90% by weight/10% by weight blend of PVDF-1/PMMA-1;

Layer B/Intermediate bonding layer: 6 microns (0.25 mil) thick 90% by weight/10% by weight blend of PMMA-1/PVDF-1; and Layer C/Reinforcing layer: 69 microns (2.75 mils) thick PU-1.

The article was tested for temperature resistance, weatherability, flexibility, delamination, removability, and fluid resistance according to the following test procedures.

Temperature Resistance—Groove Deformation

A sample of the drag reduction article was suspended in an air-circulating oven at 100° C. for 72 hours. After removal from the oven, the sample was examined under a 500 power microscope to determine whether there had been any change in the profile of the patterned surface. No change was observed when compared to a sample that had not been heat aged.

Weatherability (Yellowness Index)

5.1 cm wide×10.2 cm long (2 in. wide×4 in. long) strips of the drag reduction article were applied to a primed aluminum panel either painted with a 100 micron (0.004 inch) thick coating of a two-part polyurethane paint (Alumagrip Matterhorn White, available from U.S. Paint and Lacquer) (PANEL A), or a panel painted with a 100 micron (0.004 inch) thick coating of a two part polyurethane paint (PU 66 ETE, available from International Celomer) (PANEL B). The strips of drag reduction article were applied by spraying them with a dilute solution of detergent in water, applying the strips to the 30.5 cm×30.5 cm×0.16 cm (12 in.×12 in.×0.063 in.) panel, squeezing out the water, and letting the panel dry at room temperature. The panels were painted according to the instructions of the paint manufacturer.

The panel was then subjected to one of the following weathering conditions:

CONDITION A: 41.7 cycles (500 hours), each cycle including 8 hours of fluorescent ultraviolet (UV) light exposure (FS-40 313/280, commercially available from Q-Panel Inc., Cleveland, Ohio) at 70° C., followed by 4 hours of condensation at 50° C. in accordance with ASTM G 53–95 in a Type A test chamber from Atlas, Chicago, Ill.;

CONDITION B: 500 hours at 80° C.;

CONDITION C: 500 hours exposure to fluorescent ultraviolet (UV) light (FS-40 313/280) at 30° C., or CONDITION D: 24 cycles comprising 25 minutes at 70° C., followed by 5 minutes at −55° C. to −65° C.

The panel bearing the test strips was then evaluated for yellowness index using a Labscan2 calorimeter from Hunter Associates with a Illuminant D65 light source. The yellowness index measurement was taken from the exposed surface of the test strip on the panel, and the surface of the paint under the test strip after the test strip has been removed. The difference between these two values is reported as Δ Yellowness Index and represents the change in appearance of the drag reduction article as a result of weathering exposure. Higher values indicate a greater change in appearance. The desired result is no change in yellowness index between the initial measurement (i.e., before weathering) and the final measurement (i.e., after weathering).

Flexibility

PANEL B was prepared and exposed to CONDITION D as described in the Weatherability Test or the following as CONDITION E: 121° C. for 4 hours followed by at 23° C. for 1 hour and then the CONDITION E panel was bent around a 25 mm (one inch) diameter cylindrical mandrel. The panel was observed for cracking of the test strip and for lifting of the test strip from the panel surface especially around the edges of the test strip.

Delamination

Strips of drag reduction article were applied to a painted aluminum panel using the procedure described in the Flexibility Test. The panel with the test strips attached was then chilled to −55° C. At this temperature, the test strip was peeled from the panel by hand at a 180° angle. It is desirable that the strip break into pieces rather than delaminate as a single piece.

Removability 2.54 cm wide×30.5 cm long (1 in. wide×12 in. long) strips of the drag reduction article were applied to PANEL B using the procedure described in the Weatherability Test. The panel with the test strips attached was then subjected to either CONDITION A as described in the Weatherability Test above or the following as CONDITION F: room temperature (23° C.). The panel with test strips was tested at room temperature (23° C.) for 180° peel adhesion at a crosshead speed of 30.5 cm (12 inches) per minute at various time intervals.

Fluid Resistance

PANELS A and B as described in the Weatherability Test were prepared and conditioned at room temperature (23° C.) for 7 days prior to submersion in various test fluids at different temperatures. Three panels of each type were tested. In addition, the panels were subjected to thermal shock in deicing fluid by cycling the panels between a container of deicing fluid maintained at 90° C. for 15 minutes and a container of deicing fluid maintained at −15° for 15 minutes for 24 cycles. Upon removal from the test fluid, the panels were rinsed with water and allowed to dry at room temperature (23° C.) for 24 hours. The test strips were then tested for 180° peel adhesion at a crosshead speed of 30.5 cm (12 inches) per minute.

Results for weatherability, flexibility, removability and fluid resistance are given in the tables below. When tested for delamination, the strip broke and was only removable in small pieces, rather than one large continuous piece.

| Weatherability | | |
|---|---|---|
| Condition | Panel | Δ Yellowness Index |
| A | A | 5.1 |
| A | B | 6.8 |
| B | A | 2.4 |
| B | B | 3.6 |
| C | A | 4.2 |
| C | B | 4.3 |
| Initial | A | 1.1 |
| Initial | B | 0.6 |

A comparative drag reduction article was prepared according to Example 5 in U.S. Pat. No. 4,986,496 (Marentic et al.). When tested under Condition A on PANEL A, this article had Δ Yellowness Index of 28.8.

| Flexibility | | | |
|---|---|---|---|
| Condition | Cracking | Edge Lifting | Adhesion Loss |
| D | None | None | None |
| E | in layers 11 and 12 | None | None |

| Removability | | |
|---|---|---|
| Condition | Time Interval | Adhesion N/100 mm |
| A | initial - 0 hours | 35 |
|  | 250 hours | 65 |
|  | 500 hours | 77 |
|  | 750 hours | 66 |
|  | 1000 hours | strip could not be removed in one piece* |
| F | initial - 0 days | 27.5 |
|  | 0.75 days | 32.6 |
|  | 7 days | 35.8 |
|  | 12 days | 37.3 |
|  | 33 | 36.6 |
|  | 126 | 44.0 |
|  | 175 | 50.4 |
|  | 302 | 42.9 |
|  | 634 | 54.7 |

*film breaks at 180° peel angle but could be removed at a 90° peel angle without breaking.

After 634 days of aging at room temperature, the test strips were still removable in one piece. There was no separation from the bonding layer and no adhesive residue was left on the test panel. The comparative drag reduction article referred to previously, when tested under CONDITION A, could not be removed without breaking into many pieces. When tested under CONDITION F after 7 days, the film was no longer removable due to excessive adhesion buildup (adhesion greater than about 120N/100 mm).

Fluid Resistance

| Condition | Panel | Adhesion N/100 mm |
|---|---|---|
| Initial | B | 33 |
| Hydraulic fluid*, 7 days at 23° C. | B | None |
| Jet fuel**, 7 days at 23° C. | B | <1 |
| Deicing fluid***, 7 days at 70° C. | B | 16.5 |
| Deicing fluid***, 1 day at 90° C. | B | 31.2 |
| Thermal Shock Cycle | B | 29.7 |
| Water, 14 days at 23° C. | B | 31.3 |

*Hydraulic fluid: Hyjet ™ IV-A available from Chevron.
**Jet fuel: Jet A1
***Deicing fluid: Aeroshell ™ #7 (mixture of ethylene glycol, isopropyl alcohol, and water)

In the presence of hydraulic fluid, both the pressure sensitive adhesive layer and the polyurethane reinforcing layer were substantially compromised resulting in a loss of adhesion. In the presence of jet fuel, the pressure sensitive adhesive layer was attacked causing a loss of adhesion. The polyurethane reinforcing layer swelled but did not delaminate from the intermediate bonding layer. There was no substantial change in appearance of the outer patterned layer after exposure to the deicing fluid or water.

A modified drag reduction article was then prepared as described in this example except that the exposed edges were sealed using Scotch-Weld™-DP-240 epoxy adhesive from 3M. In addition, the article was not perforated, and the combined thickness of the intermediate bonding layer and that portion of the outer patterned layer extending from its inner surface to the bottom of the valleys was increased. The modified drag reduction article was exposed to hydraulic fluid as described above and with improved results. There was no substantial change in the appearance of the drag reduction pattern and no swelling, rippling or buckling of the article was observed.

Various modifications are possible within the scope of the foregoing specification and drawings without departing from the invention which is defined by the accompanying claims.

The embodiments for which an exclusive property or privilege is claimed are defined as follows:

1. A multilayer drag reduction article comprising:
  (a) an outer layer having an exposed, patterned surface that reduces the drag caused by a fluid flowing over the surface;
  (b) an inner, reinforcing layer; and
  (c) an intermediate bonding layer for bonding the outer layer to the reinforcing layer,
wherein material comprising the inner, reinforcing layer is more elastic than material comprising the intermediate bonding layer.

2. A multilayer drag reduction article comprising:
  (a) an outer layer having an exposed, patterned surface that reduces the drag caused by a fluid flowing over the surface;
  (b) an inner, reinforcing layer; and
  (c) an intermediate bonding layer for bonding the outer layer to the reinforcing layer,
wherein material comprising the inner, reinforcing layer has at least about 300% elongation without breaking.

3. The multilayer drag reduction article of claim 2, wherein the outer layer comprises a fluoropolymer.

4. A multilayer drag reduction article comprising:
  (a) an outer layer having an exposed, patterned surface that reduces the drag caused by a fluid flowing over the surface;
  (b) an inner, reinforcing layer; and
  (c) an intermediate bonding layer for bonding the outer layer to the reinforcing layer,
wherein the inner, reinforcing layer comprises a material selected from the group consisting of thermoplastic polyurethanes and poly(vinyl chloride).

5. A multilayer drag reduction article comprising:
  (a) an outer layer having an exposed, patterned surface that reduces the drag caused by a fluid flowing over the surface;
  (b) an inner, reinforcing layer; and
  (c) an intermediate bonding layer for bonding the outer layer to the reinforcing layer,
wherein material comprising the inner, reinforcing layer is more elastic than material comprising the outer layer.

6. A drag reduction article according to claim 5 wherein the outer layer comprises a blend of at least one polymer having good bonding properties to the intermediate bonding layer, and at least one polymer having good chemical and weather resistance properties.

7. A drag reduction article according to claim 6 wherein the at least one polymer having good bonding properties to the intermediate bonding layer is an acrylic polymer and the at least one polymer having good chemical and weather resistance properties is a fluoropolymer.

8. A drag reduction article according to claim 1 wherein at least one of the outer layer and the intermediate bonding layer comprises the polymerization product of at least one monomer selected from the group consisting of methyl methacrylate, ethyl methacrylate, butyl methacrylate, and blends thereof.

9. A drag reduction article according to claim 8 wherein the at least one of the outer layer and the intermediate bonding layer further comprises at least one fluoropolymer.

10. A drag reduction article according to claim 9 wherein the at least one fluoropolymer includes polymerized units of vinylidene fluoride.

11. A drag reduction article according to claim 10 wherein the fluoropolymer is selected from the group consisting of poly(vinylidene fluoride), tetrafluoroethylene-hexafluororopylene-vinylidene fluoride terpolymer, and blends thereof.

12. A drag reduction article according to claim 1 wherein:
  the outer layer comprises a blend of first and second polymers, the first polymer comprising at least 70% by weight of at least one fluoropolymer, and the second polymer comprising at most 30% by weight of at least one acrylic polymer; and
  the intermediate bonding layer comprises a blend of first and second polymers, the first polymer comprising at most 30% by weight of at least one fluoropolymer, and the second polymer comprising at least 70% by weight of at least one acrylic polymer.

13. A drag reduction article according to claim 1 wherein the inner reinforcing layer is a thermoplastic polyurethane.

14. A drag reduction article according to claim 1 wherein the exposed, patterned surface comprises a series of essentially parallel peaks separated by a series of essentially parallel valleys.

15. A drag reduction article according to claim 1 further comprising a layer of adhesive on the inner reinforcing layer for bonding the drag reduction article to a surface.

16. An assembly comprising a drag reduction article according to claim 15 that has been adhesively bonded to a surface so as to reduce the drag caused by a fluid flowing over that surface.

17. A multilayer drag reduction article comprising;
   (a) an outer layer having an exposed, patterned surface that reduces the drag caused by a fluid flowing over the surface, wherein:
      (1) the outer layer comprises at least one polymer that includes polymerized units of vinylidene fluoride, and at least one polymer that comprises the polymerization product of at least one monomer selected from the group consisting of methyl methacrylate, ethyl methacrylate, butyl methacrylate, and blends thereof; and
      (2) the exposed, patterned surface is a series of essentially parallel peaks separated by a series of essentially parallel valleys;
   (b) an inner, reinforcing layer;
   (c) an intermediate bonding layer for bonding the outer layer to the reinforcing layer wherein the intermediate bonding layer comprises at least one polymer that includes polymerized units of vinylidene fluoride, and at least one other polymer that comprises the polymerization product of at least one monomer selected from the group consisting of methyl methacrylate, ethyl methacrylate, butyl methacrylate, and blends thereof, wherein material comprising the inner, reinforcing layer is more elastic than material comprising the outer layer; and
   (d) a pressure sensitive adhesive on the inner reinforcing layer for bonding the drag reduction article to a surface.

18. A drag reduction article according to claim 17 wherein the at least one polymer that includes polymerized units of vinylidene fluoride is independently selected for both the outer layer and the intermediate bonding layer from the group consisting of poly(vinylidene fluoride), tetrafluoroethylene-hexafluoropropylenevinylidene fluoride terpolymer, and blends thereof.

19. A drag reduction article according to claim 18 wherein the at least one other polymer is poly(methyl methacrylate).

20. A drag reduction article according to claim 17 wherein the inner, reinforcing layer is a thermoplastic polyurethane.

21. An article that is capable of reducing the drag caused by a fluid flowing, over a substrate to which the article is attached, the drag reduction article comprising:
   (a) an outer layer having an exposed, patterned surface that reduces the drag caused by the fluid flowing over the surface, wherein:
      (1) the outer layer comprises a blend of first and second polymers, the first polymer comprising at least 70% by weight of at least one polymer that is selected from the group consisting of poly(vinylidene fluoride), tetrafluoroethylene-hexafluoropropylene-vinylidene fluoride terpolymer, and blends thereof, and the second polymer comprising at most 30% by weight poly(methyl methacrylate); and
      (2) the exposed, patterned surface is a series of essentially parallel peaks separated by a series of essentially parallel valleys;
   (b) a thermoplastic polyurethane inner, reinforcing layer;
   (c) an intermediate bonding layer for bonding the outer layer to the reinforcing layer wherein the intermediate bonding layer comprises a blend of first and second polymers, the first polymer comprising at most 30% by weight of at least one polymer that is selected from the group consisting of poly(vinylidene fluoride), tetrafluoroethylene-hexafluoropropylene-vinylidene fluoride terpolymer, and blends thereof, and the second polymer comprising at least 70% by weight poly(methyl methacrylate); and
   (d) a pressure sensitive adhesive on the inner reinforcing layer for bonding the drag reduction article to the substrate.

22. An assembly comprising a drag reduction article according to claim 21 that has been adhesively bonded to the surface of an airplane so as to reduce the drag caused by a fluid flowing over that surface.

23. A method of reducing the drag caused by a fluid flowing over a surface, the method comprising the steps of:
   (a) providing a surface over which a fluid may flow;
   (b) providing an article capable of reducing the drag created by the fluid flowing over the surface provided in step (a), the article comprising:
      (1) an outer layer having an exposed, patterned surface that reduces the drag caused by the fluid flowing over the surface;
      (2) an inner, reinforcing layer; and
      (3) an intermediate bonding layer for bonding the outer layer to the reinforcing layer,
   wherein material comprising the inner reinforcing layer is more elastic than material comprising the outer layer; and
   (c) attaching the article from step (b) to the surface provided in step (a) so as to reduce the drag created by the fluid flowing over that surface.

24. A method according to claim 23 wherein the article capable of reducing drag comprises:
   (1) an outer layer having an exposed, patterned surface that reduces the drag caused by a fluid flowing over the surface, wherein:
      (A) the outer layer comprises at least one polymer that includes polymerized units of vinylidene fluoride, and at least one polymer that comprises the polymerization product of at least one monomer selected from the group consisting of methyl methacrylate, ethyl methacrylate, butyl methacrylate, and blends thereof; and
      (B) the exposed, patterned surface is a series of essentially parallel peaks separated by a series of essentially parallel valleys;
   (2) an inner, reinforcing layer;
   (3) an intermediate bonding layer for bonding the outer layer to the reinforcing layer wherein the intermediate bonding layer comprises at least one polymer that includes polymerized units of vinylidene fluoride, and at least one other polymer that comprises the polymerization product of at least one monomer selected from the group consisting of methyl methacrylate, ethyl methacrylate, butyl methacrylate, and blends thereof, and
   (4) a pressure sensitive adhesive on the inner reinforcing layer for bonding the drag reduction article to the surface.

25. A method according to claim 23 wherein the article capable of reducing drag comprises:
   (1) an outer layer having an exposed, patterned surface that reduces the drag caused by the fluid flowing over the surface, wherein:
      (A) the outer layer comprises a blend of first and second polymers, the first polymer comprising at least 70% by weight of at least one polymer that is selected from the group consisting of poly(vinylidene fluoride), tetrafluoroethylene-hexafluoropropylenevinylidene fluoride terpolymer, and blends thereof, and the second polymer comprising at most 30% by weight poly(methyl methacrylate); and (B) the exposed, patterned surface is a series of essentially parallel peaks separated by a series of essentially parallel valleys;

(2) a thermoplastic polyurethane inner, reinforcing layer;

(3) an intermediate bonding layer for bonding the outer layer to the reinforcing layer wherein the intermediate bonding layer comprises a blend of first and second polymers, the first polymer comprising at most 30% by weight of at least one polymer that is selected from the group consisting of poly(vinylidene fluoride), tetrafluoroethylene-hexafluoropropylene-vinylidene fluoride terpolymer, and blends thereof, and the second polymer comprising at least 70% by weight poly(methyl methacrylate); and (4) a pressure sensitive adhesive on the inner reinforcing layer for bonding the drag reduction article to the surface provided in step (a).

* * * * *